United States Patent Office 3,070,423
Patented Dec. 25, 1962

3,070,423
PREPARATION OF WHITE IRON PHOSPHATE
Bruce T. Alexander and William B. Mathes, Louisville, Ky., assignors to Chemetron Corporation, Chicago, Ill., a corporation of Delaware
No Drawing. Filed Oct. 17, 1960, Ser. No. 62,901
5 Claims. (Cl. 23—105)

This invention relates to a method of preparing white iron phosphate from iron. More particularly this invention relates to a method of preparing white ferric orthophosphate from iron by reaction with phosphoric acid followed by oxidation to produce ferric orthophosphate in a substantially colorless form. It is an object of this invention to provide a method for preparing substantially white ferric phosphate having physical and chemical characteristics suitable for use as a mineral supplement for flour and bread. It is another object to produce ferric orthophosphate having a ratio of $Fe_2O_3$ to $P_2O_5$ which is substantially unity. A further object is to provide a method of producing white ferric orthophosphate meeting Food and Drug standards from iron powder such as reduced mill scale. These and other objects are apparent from and achieved in accordance with the following description of the invention.

It has long been recognized that the iron content of whole cereal grains, especially wheat, is a property of considerable nutritional value. Medical authorities have advocated consumption of whole wheat cereal products as a means of increasing the amount of iron supplied by the average human diet. However, in the milling of these cereal products, particularly whole wheat products, to form flours, much of the iron distributed throughout the tissue adjacent to and constituting the bran layer is lost so that the products which are obtained are relatively low in this nutritional element. This has resulted in the introduction of the "enriched" flours and breads on the market and now the addition of an assimilable iron compound which is substantially white in color has been made a prerequisite for these products.

Earlier known methods for preparing ferric orthophosphate have involved a double decomposition reaction of soluble ferric salts and alkali phosphates. Generally these processes yield products which are colored. Where ferric phosphates are to be incorporated with food, flour and other cereal products, it is desirable that these phosphates be white or only slightly colored and consequently the ferric phosphates of the prior art are not suitable for this purpose.

The present invention is based upon the discovery that metallic iron may be reacted with phosphoric acid of at least 3.4 weight percent to form ferrous phosphate which is then oxidized preferably at elevated temperature to insoluble ferric orthophosphate in a substantially white insoluble form. This is preferably done by adding just enough phosphoric acid (2–5% excess over the theoretical amount required to form ferrous phosphate) to dissolve all of the iron, then diluting the reaction mixture with water, raising the temperature and oxidizing the mixture by blowing air through it. The iron phosphate does not dissolve in the aqueous solution but precipitates out in virtually white color in a form suitable for use as a mineral supplement to foods and drugs. Other oxidizing agents may be used, for example, sodium peroxide and hydrogen peroxide, but dilution of the reaction mixture with water and air blowing is the preferred procedure because of more rapid oxidation and greater economy. When sodium peroxide or hydrogen peroxide are used they should be dissolved in water to form solutions of 5–10% concentration. The preferred concentration of sodium peroxide is a 5% aqueous solution and the preferred concentration of hydrogen peroxide is 10%. The iron which is used as the starting material may be any form of iron, preferably in finely divided form, wherein the content of undesirable materials, such as arsenic, lead and manganese, is below levels approved for food and drug use. A preferred form of iron is reduced iron powder obtained by the hydrogen reduction of mill scale. Chemical analysis of such iron powder falls within the following ranges:

|  | Maximum, percent | Typical, percent |
|---|---|---|
| Hydrogen Loss | 0.80 | 0.24 |
| Total carbon | 0.10 | 0.009 |
| Total acid insoluble | 0.50 | 0.14 |
| Sulfur | 0.03 | 0.008 |
| Phosphorus | 0.03 | 0.008 |
| Manganese | 0.60 | 0.18 |
| Copper | 0.50 | 0.04 |
| Chromium | 0.50 | 0.08 |
| Iron | Balance | Balance |

Apparent Density _____ g./cc__ 2.4–2.7
Packed Density _____ do____ 3.2–3.3

Iron phosphate of food grade must meet the following specifications:

$P_2O_5$ _____ 38.5–41%.
Fe (reported as metal) _____ 28.0–30.0%.
Arsenic _____ 0.00005 to 0.0005%.
Lead _____ 0.5 to 1.0 p.p.m.
Color _____ White.

It has been found that high yields of iron phosphate meeting the foregoing specifications can be uniformly produced by reacting iron powder with phosphoric acid followed by oxidation in accordance with the procedure of this application. A product so produced corresponds to the formula $FePO_4 \cdot 2H_2O$.

The invention is disclosed in further detail by the following examples which are provided merely for the purpose of illustration and are not to be construed as limiting the invention in scope. It will be readily appreciated by those skilled in the art that numerous modifications in temperatures relative quantities of materials, concentrations of reagents and the like may be made without departing from the invention. Likewise, equivalent materials may be employed in lieu of those disclosed herein within the scope of this invention.

*Example 1*

50 grams of iron powder produced by the hydrogen reduction of mill scale having the following analysis:

| | Percent |
|---|---|
| Hydrogen loss | 0.24 |
| Total carbon | 0.009 |
| Total acid insoluble | 0.14 |
| Sulfur | 0.008 |
| Phosphorus | 0.008 |
| Manganese | 0.18 |
| Copper | 0.04 |
| Chromium | 0.08 |
| Iron | Balance | where reacted with 3 liters of 7.5% $H_3PO_4$ at 30° C. for 64 hours with agitation and air blowing. A grayish white residue of iron phosphate resulted. The temperature was raised to 70° C. and 140 ml. of 85% $H_3PO_4$ was added in 10 ml. amounts. During this process the residue of iron phosphate turned white. This was removed by filtration, washed with water and dried. A yield of 91.3% (based on iron powder used) of ferric orthophosphate was obtained which analyzed 30.2% Fe and 16.9% P.

*Example 2*

To 3 liters of water at 50° C. were added 150 ml. of

85% H₃PO₄ and 75 grams of iron powder. The mixture was agitated for about one-half hour and then 10 grams of sodium peroxide dissolved in 200 ml. of water were added. The mixture was stirred and air blown for 16 to 20 hours at the rate of 7 liters of air per hour. A black residue larger than the original iron charge formed and a green supernatant liquid was produced. The solution had a pH of 2.7 and a temperature of 28° C. 10 ml. of 30% hydrogen peroxide solution were added with the formation of a lighter colored precipitate. The solution was heated to 45° C. and agitated and air blown for 15 hours without heating at the rate of 7 liters of air per hour. The clear supernatant liquid had a pH of 2. The slurry was heated to 80° C. and agitated for 3 to 4 hours during which time the precipitate of iron phosphate acquired the desired white color. The precipitate weight 230 grams (91% yield based on the iron used) and met the specification for food grade use.

*Example 3*

To 2 liters of water at room temperature were added 50 ml. of 85% H₃PO₄ and 25 grams of iron powder. The mixture was agitated and air blown (7 liters per hour) at 25–30° for 16 to 20 hours. At this point a gray precipitate formed and all the iron had been dissolved. 5 grams of sodium peroxide dissolved in 100 ml. of water were added slowly with good agitation and then the slurry heated to 80° C. The precipitate of iron phosphate gradually whitened and air blowing and agitation for 3 to 4 hours was continued until a white product formed. A yield of 74 grams of FePO₄·2H₂O (89% yield based on the iron used) was obtained meeting food grade specifications.

What is claimed as new and is desired to be secured by Letters Patent of the United States is:

1. Method of producing white iron phosphate of the formula FePO₄·2H₂O which comprises reacting iron powder with 2–5% excess of an aqueous solution of phosphoric acid of at least 3.4 weight percent concentration to form iron phosphate, diluting the reaction mixture to precipitate the ferrous phosphate, raising the temperature to at least 45° C. and adding an excess of oxidizing agent selected from the group consisting of air, oxygen, hydrogen peroxide and sodium peroxide to the reaction mixture to form white, insoluble iron phosphate.

2. The method of claim 1 wherein the oxidizing agent is air.

3. The method of claim 1 wherein the oxidizing agent is hydrogen peroxide.

4. The method of claim 1 wherein the oxidizing agent is sodium peroxide.

5. Method of producing white iron phosphate of the formula FePO₄·2H₂O which comprises suspending iron powder in 2–5% excess of aqueous phosphoric acid having a concentration not less than 3.4% by weight, passing air through the suspension while the latter is maintained at a temperature not greater than 30° C. to oxidize the iron and form iron phosphate, diluting the solution to precipitate the ferrous phosphate, and raising the temperature to at least 45° C. and adding an excess of aqueous 10–30% hydrogen peroxide to form white, insoluble iron phosphate.

References Cited in the file of this patent
UNITED STATES PATENTS

| | | |
|---|---|---|
| 1,271,002 | Allen | July 2, 1918 |
| 1,769,057 | Green et al. | July 1, 1930 |
| 2,977,191 | Pottiez | Mar. 28, 1961 |